United States Patent [19]

Meador

[11] Patent Number: 4,783,227
[45] Date of Patent: Nov. 8, 1988

[54] SYSTEM AND METHOD FOR SEALING A BURIED CABLE SPLICE

[76] Inventor: James H. Meador, 516 Shadowridge Dr., Ballwin, Mo. 63011

[21] Appl. No.: 43,338

[22] Filed: Apr. 28, 1987

[51] Int. Cl.$^4$ .............................................. H01B 13/06
[52] U.S. Cl. ...................................... 156/49; 156/48; 156/294; 174/35 C; 174/76; 174/84 R; 428/36.1; 428/36.5; 428/36.9
[58] Field of Search .................. 156/48, 49, 293, 294; 174/35 C, 76, 84 R; 428/36

[56] References Cited

U.S. PATENT DOCUMENTS 4,070,543  1/1978  Thompson et al. ............... 156/49 X
4,466,843  8/1984  Shimirak ................................. 156/48

Primary Examiner—Robert A. Dawson
Attorney, Agent, or Firm—Polster, Polster & Lucchesi

[57] ABSTRACT

A two-component settable liquid is mixed in a tube to start the setting of the liquid. A pair of electrical cables are separately fed through a retaining cap and a splice is made between the cables. The splice is inserted into the mixed settable liquid and the retaining cap is secured on the tube to hold the splice in the mixed settable liquid while the liquid sets to form a seal about the splice. Various structure is also shown to pressurize the contents of the tube to force the settable liquid into and around the splice.

25 Claims, 2 Drawing Sheets

SYSTEM AND METHOD FOR SEALING A BURIED CABLE SPLICE

BACKGROUND OF THE INVENTION

This invention relates generally to splices in electrical cable and more particularly to a system and method for making splices for buried electric cable such as telephone cable and the like.

In the past telephones were connected to the local exchange by overhead wires. However, such a system had several disadvantages. Exposure to weather necessitated using strong wires many times larger than was needed just to carry the current. Such exposed wires were also subject to inductive effects from high voltage equipment and from atmospheric electricity. As a result, present practice is to use large, multi-pair cables running underground from the exchange. By way of example, two and five pair cables are generally used for residential use and will be used for illustrative purposes herein, although the present invention is certainly not limited to cables of those particular sizes.

Buried cable generally includes a moisture-proof sheath since the presence of moisture in the cable can severely affect the operation of the cable. In addition, once moisture enters the cable it is able to migrate long distances along the cable. When it is necessary to form a splice on buried cable, therefore, it is quite important to insure that the splice is as moisture-proof as possible in order to prevent the problems which arise from moisture from entering the cable.

SUMMARY OF THE INVENTION

Among the various objects and features of the present invention may be noted the provision of a system and method for sealing electrical cables which minimizes the possibility of moisture infiltrating the cables.

Another object of the present invention is the provision of such a system and method which simplifies the process of sealing the cable splice.

Another object of the present invention is the provision of such a system and method which is readily usable without significant training.

Another object of the present invention is the provision of such a system and method which ensures a secure seal around the splice while minimizing the attendant mess.

Other objects and features will be in part apparent and in part pointed out hereinafter.

Briefly, a system of the present invention includes a tube having a generally open end to allow insertion of a splice into the interior of the tube, a settable sealing liquid disposed in the tube such that when the splice is inserted in the tube at least a predetermined distance the splice is immersed in the liquid, and structure for pressurizing the interior of the tube once the splice is inserted therein to force the settable sealing liquid into and around the splice before the liquid sets to form a seal about the splice.

In a second embodiment of the present invention a system for sealing a splice between a plurality of electrical cables includes a rigid tube having a generally open end to allow insertion of a splice into the interior of the tube, a settable sealing liquid disposed in the tube such that when the splice is inserted in the tube at least a predetermined distance the splice is immersed in the liquid, and structure for holding the splice in place with respect to the tube once the splice is immersed in the sealing liquid.

A method of the present invention includes the steps of mixing a two-component settable liquid in a tube to start the setting of the liquid, feeding each of a pair of cables separately through a retaining cap, making a splice between the cables, and inserting the splice into the mixed settable liquid and securing the retaining cap on the tube to hold the splice in the mixed settable liquid while the liquid sets to form a seal about the splice.

In another embodiment the method of the present invention includes the steps of making a splice between a pair of cables; reciprocatingly moving a plunger with a mixer head in a rigid tube containing two components of a settable liquid to mix the two components to initiate the setting of the liquid, said plunger being sealingly mounted in a relatively open end of the rigid tube to prevent the settable liquid from escaping from the tube during mixing; removing the plunger from the rigid tube to open the relatively open end of the tube; and inserting the splice through the relatively open end of the tube and immersing the splice in the the mixed settable liquid before the liquid sets, so that the settable liquid as it sets forms a seal about the splice.

A BRIEF DISCRIPTION OF THE DRAWINGS

Similar reference characters indicate similar parts throughout the several views of the drawings.

DESCRIPTION OF THE PREFERRED EMBODIMENTS

Figure 1:
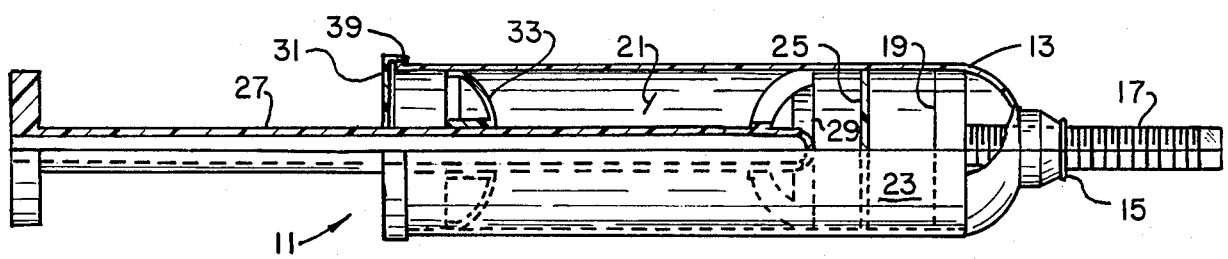
FIG. 1 is a side elevation with parts broken away of one embodiment of the splice sealing system of the present invention.

System 11 of the present invention (FIG. 1) includes a relatively rigid tube of a suitable material such as polyethylene. Tube 13 has a relatively small axial threaded opening 15 at one end thereof in which is disposed a threaded rod 17 operatively connected to a piston 19 disposed for longitudinal movement inside rigid tube 13. Tube 13 also includes a pair of compartments 21 and 23 separated by a rupturable barrier 25. By way of illustration, compartment 21 contains a base and compartment 23 contains a curing agent for a relatively quick setting material such as a quick setting epoxy. Preferably the epoxy in the embodiment of FIG. 1 sets in less than an hour or so after mixing, although the present invention is not so limited. Setting times of much less than one hour are acceptable as are greater setting times.

A plunger 27 having a relatively open mixer head 29 at one end is provided for breaking the seal formed by rupturable membrane 25 and mixing the two components of the epoxy in compartments 21 and 23. The plunger is axially mounted through an opening in an end cap 31 disposed over the generally open end (on the left side as shown in FIG. 1) of tube 13. The shaft of plunger 27 also extends through a sealing plug 33 disposed in the relatively open end of tube 13. Sealing plug 33 prevents liquid in compartment 21 from seeping out.

Tube 13 has an outer diameter of approximately one and ⅞" and a length of approximately six and ½". Threaded rod 17 has approximately two inches of travel so that piston 19 may be moved inside rigid tube 13 approximately that distance. This particular size for the components of system 11 has proved adequate for sealing a splice of a five pair cable. In particular the amount of travel of piston 19 is such as to expel all the air from rigid tube 13 and pressurize the contents a suitable amount as described below. Other sizes of components would of course be used depending upon the size of the cable to be spliced.

Figure 2:
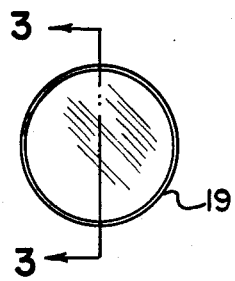
FIG. 2 is an elevation of a piston used in conjuction with the system of FIG. 1.
Figure 3:
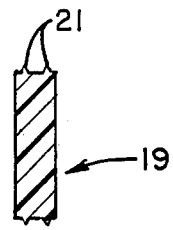
FIG. 3 is a cross section taken along line 3—3 of FIG. 2.

As shown in FIGS. 1 and 2, piston 19 is generally circular and is generally the same diameter as the inside diameter of rigid tube 13. As shown in FIG. 3, piston 19 includes a pair of circumferential ridges 21 which provide a wiping action against the inside wall of rigid tube 13 to insure that as the interior of the tube is pressurized, as described below, the fluid does not seep past piston 19.

Once structural membrane 25 has been broken by plunger 27 and the two components of the epoxy have been thoroughly mixed by relatively open mixer head 29 of plunger 27, cap 31, sealing plug 33, and plunger 27 are removed from rigid tube 13 so that the leftmost end of the tube as shown in FIG. 1 is fully open. Of course, at this time the open end is held upright so that the epoxy does not flow out of the tube.

Figure 4:
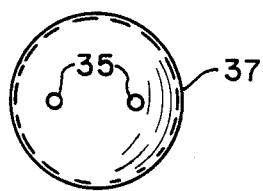
FIG. 4 is a top plan of a cap used with the system of FIG. 1.

Prior to the mixing of the epoxy, the two cables to be spliced are slipped through a pair of openings 35 in a vinyl end cap 37 (FIG. 4) which is of a suitable size to slip over the relatively open end of tube 13. Vinyl cap 37 is chosen to be small enough so that once slipped on tube 13 it is securely held thereon by a friction fit. Tube 13 includes an outwardly extending lip 39 to promote such a friction fit.

Figure 6:
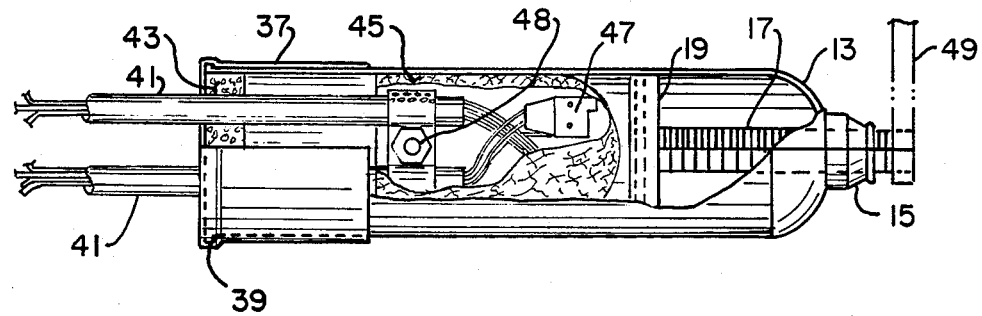
FIG. 6 is a view similar to FIG. 1 showing a pair of cables spliced together in the system of FIG. 1.
Figure 5:
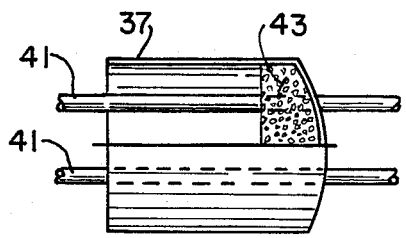
FIG. 5 is a side elevation with parts broken away of the cap of FIG. 4 and cooperating members of the system of FIG. 1.

The two cables, labeled 41 in FIG. 5, are also fed through two openings in a relatively thin foam plug 43 made of closed cell polyurethene of the flexible type or another suitable material. Since the foam plug is flexible, the openings therethrough are of such a size as to accommodate various sizes of cable 41 while still providing a good seal around the cables. This plug 43 is sized to fit inside cap 37 and inside rigid tube 13 as shown in FIG. 6. A pounch or sleeve 45 of relatively opened plastic mesh material such as reticulated polyurethane is sized to receive the splice and is placed around the splice once the splice is made.

More particularly, once cables 41 are inserted through cap 37 and the foam plug 43, the electrical splice, labeled 47 in FIG. 6, may be made between their exposed ends. The cables are held together by a split-bolt clamp of other suitable clamp 48. If the cables include electrical shielding, the clamp also provides an electrical connection between the shielding of the two cables. After the splice is made, it is slipped into pouch 45 and the unit consisting of the cables, the cap 37, foam plug 43 and pouch 45 is slid into and over the open end of tube 13 until cap 37 is seated in the desired position on the relatively open end of the tube. This position is selected so that the splice itself is completely covered with the epoxy liquid at this time. Of course, by suitably increasing the travel of piston 19, the splice need not initially be disposed in the settable liquid. It is important, however, that the splice be fully immersed in settable liquid once the splicing and sealing process is completed. Once the cap is seated, threaded rod 17 is rotated by means of a handle 49 to cause piston 19 to move to the left as shown in FIG. 6 to compress the liquid in the interior of tube 13. This compression forces all air out of the interior of tube 13 and forces the sealing liquid into and around the splice to form a moisture-proof seal about the splice and forces sealing liquid up into the cable. Of course, cap 37, must be suitably sized so that it is not forced off of tube 13 when the pressure is applied. Other mechanical means of attachment such as tape or clamps may be used if desired to retain cap 37 on tube 13. If desired, a small vent opening with a plug (not shown) may be added to relieve excess pressure on cap 37.

Figure 7:
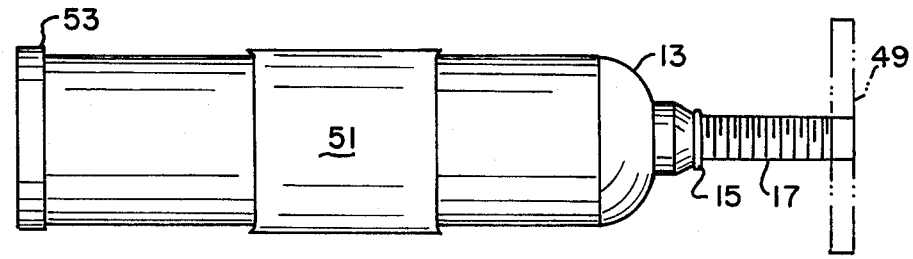
FIG. 7 is a side elevation of another embodiment of the system of the present invention.

A second embodiment of the present invention is shown in FIG. 7. In this embodiment, rigid tube 13 includes only a single internal compartment in which one of the components of the epoxy is disposed. A pouch 51 is removably secured, by gluing or the like, to the exterior of tube 13. When it is desired to mix the liquid, a cap 53 is removed from the relatively open end of tube 13 and the contents of pouch 51 poured into the interior of the relatively rigid tube. The two components of the sealing material such as an epoxy may then be mixed and the splice inserted and pressurized as described above. Of course the tube need not be packaged with either component initially, since the sealing material may be added from any desired external source.

Figure 8:
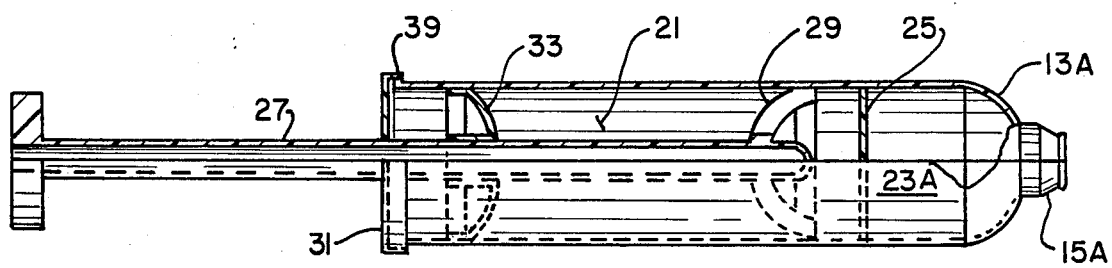
FIG. 8 is a side elevation similar to FIG. 1 illustrating a third embodiment of the present invention.
Figure 9:
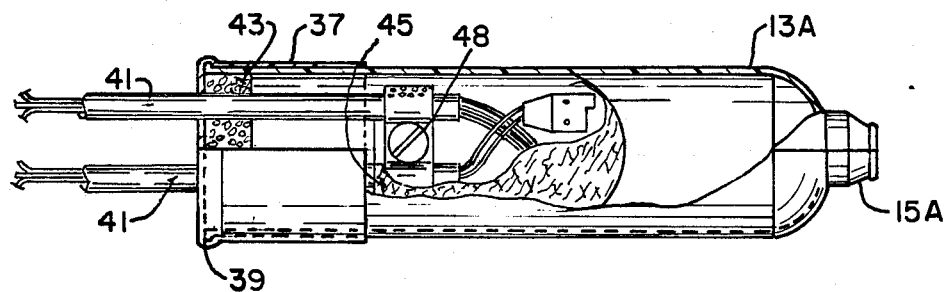
FIG. 9 is a view similar to FIG. 8 illustrating a pair of cables spliced in the system of FIG. 8.

A third embodiment of the present invention is shown in FIG. 8. This embodiment is sililar to that of FIG. 1, but includes a closed right end 15A. In the embodiment of FIG. 8, there is no threaded rod 17 or piston 19 to pressurize the contents of tube 13A once the splice has been inserted into the interior of the tube. Such a splice is shown in FIG. 9. With this embodiment, it is more important to insure that the level of the sealing liquid in the interior of tube 13A covers the splice 47. This should be contrasted with the system of FIG. 1 in which the piston 19 ensures that the splice will be covered with the sealing liquid. The system of FIGS. 8 and 9 may be used without retaining cap 37. In that event, a quick setting epoxy of the type which gels in one minute of so from mixing and sets in five minutes or so would be used in the tube. The user physically holds the splice in the epoxy with that embodiment until it becomes firm enough to hold the splice in place.

Figure 10:
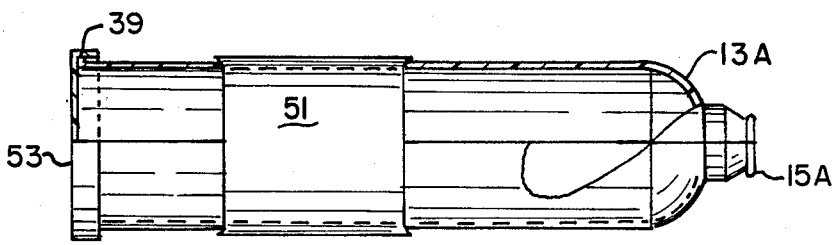
FIG. 10 is a side elevation of yet another embodiment of the present invention.

FIG. 10 shows yet another embodiment of the present invention. This embodiment, like that of FIG. 9, has a closed right end 15A so that the contents of tube 13A are not pressurized. Moreover, like the embodiment shown in FIG. 7, the embodiment of FIG. 10 includes an external pouch 51 containing one of the two components of the settable liquid which may be mixed at the appropriate time with the other component already present in the interior of tube 13A.

Figure 11:
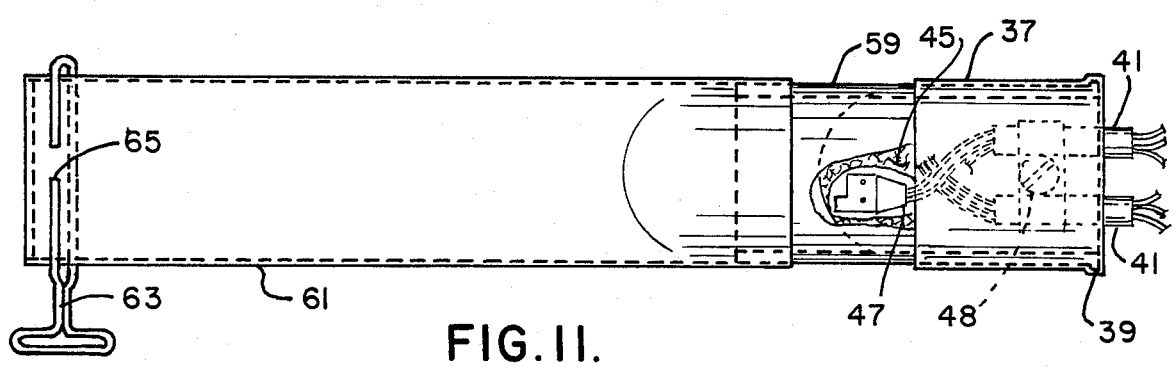
FIG. 11 is a side elevation of an alternative embodiment of the system of FIG. 1, showing the system in an unpressurized state.
Figure 12:
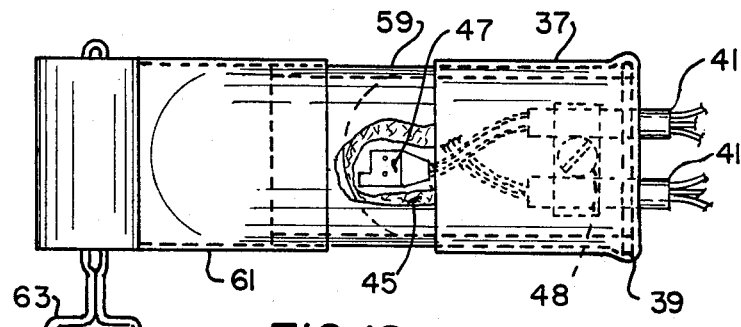
FIG. 12 is a view similar to FIG. 3 illustrating the system in a pressurized state.

A fifth embodiment of the present invention is illustrated in FIGS. 11 and 12. In this embodiment, the tube in which the splice is inserted includes a relatively rigid cylindrical section 59 of approximately three inches in length, open at both ends. A flexible tube 61 is secured to one open end of relatively open tube 59 by a suitable adhesive or the like. The relative sizes of rigid tube 59 and flexible tube 61 are selected so that the rigid tube fits tightly inside the flexible tube portion 61. By way of illustration, flexible tube 61 may be approximately two inches in diameter and approximately eight inches in length. The splice 47 is held in place in the settable liquid in relatively rigid tube portion 59 by end cap 37 as described above for the embodiment of FIG. 1. This system, like that of FIG. 1, is a pressurized system. Pressurization with this embodiment is accomplished by means of a key 63 which is disposed at the heat sealed end of flexible tube 61. This key may be used to roll up the flexible tube 61 to compress the contents of both tube 61 and tube section 59 to eliminate all voids and force sealing compound into and around the splice 47 and up into the cables themselves. Once the key has been used to roll up the flexible tube as shown in FIG. 12 to a desired position, a slot 65 in key 63 may be used to slip the key around an adjacent layer of flexible tube 61 to lock the flexible tube in place.

Although it has been assumed that the two components of the sealing compound are initially present in the interior of flexible tube 61 and/or rigid tube section 59, this need not be the case. The sealing compound can be added in the liquid state at any stage before the splice is inserted into the rigid section of the tube and the pressurization takes place.

In view of the above, it will be seen that the various objects and features of this invention are achieved and other advantageous results are obtained. As various changes could be made in the above constructions and methods without departing from the scope of the invention, it is intended that all matter contained in the above description or shown in the accompanying drawings shall be interpreted as illustrative and not in a limiting sense.

What is claimed is:

1. A system for sealing a splice between the wires of a plurality of electrical cables, such as telephone cables, cable television cables and the like, comprising:
    a tube having a generally open end to allow insertion of a splice into the interior of the tube;
    a settable sealing liquid disposed in the tube such that when the splice is inserted in the tube at least a predetermined distance the splice is immersed in the liquid; and
    means for pressurizing the interior of the tube once the splice is inserted therein to force the settable sealing liquid into and around the splice before the liquid sets to form a seal about the splice, said pressurizing means including a cap for covering the generally open end of the tube, said cap having openings for the cables of the splice to extend therethrough, said cap and said generally open end of the tube having cooperating means thereon to substantially resist removal of the cap as the interior of the tube is pressurized, said pressurizing means further including movable means disposed generally at the end of the tube opposite the cap for reducing the available interior volume of the tube as said movable means is moved towards the cap to pressurize the interior of the tube, said cap being substantially fixed in position with respect to said tube.

2. A system for sealing a splice between the wires of a plurality of electrical cable, such as telephone cables, cable television cables and the like, comprising:
    a tube having a generally open end to allow insertion of a splice into the interior of the tube;
    a settable sealing liquid disposed in the tube such that when the splice is inserted in the tube at least a predetermined distance the splice is immersed in the liquid; and
    means for pressurizing the interior of the tube once the splice is inserted therein to force the settable sealing liquid into and around the splice before the liquid sets to form a seal about the splice, wherein the tube is relatively rigid at one end thereof and relatively flexible at the other end thereof, the splice being insertable in the relatively rigid end of the tube, said pressurizing means including means for folding up the flexible end of the tube to force sealing liquid from the flexible end of the tube toward the rigid end of the tube.

3. The system as set forth in claim 1 wherein the sealing liquid is a two-component settable compound, the setting being initiated by the mixing of the two components of the compound, further including means secured to the tube for mixing the two components of the compound.

4. The system as set forth in claim 3 wherein the mixing means includes a plunger disposed at one end of the tube for axial movement in the tube.

5. The system as set forth in claim 4 wherein the plunger is removable to allow the splice to be inserted into the end of the tube from which the plunger is removed.

6. The system as set forth in claim 4 wherein the pressurizing means is at least partially disposed at the opposite end of the tube from the plunger.

7. A system for sealing a splice between the wires of a plurality of electrical cables, such as telephone cables, cable television cables and the like, comprising:
    a tube having a generally open end to allow insertion of a splice into the interior of the tube;
    a settable sealing liquid disposed in the tube such that when the splice is inserted in the tube at least a predetermined distance the splice is immersed in the liquid; and
    means for pressurizing the interior of the tube once the splice is inserted therein to force the settable sealing liquid into and around the splice before the liquid sets to form a seal about the splice, wherein the pressurizing means includes a piston disposed for axial movement in the tube generally at one end of the tube.

8. The system as set forth in claim 1 further including a foam plug shaped to fit around the cables above the splice in the tube.

9. The system as set forth in claim 8 further including an open mesh pouch disposed in the tube around the splice.

10. The system as set forth in claim 8 wherein the foam plug includes a pair of permanent openings extending therethrough, each shaped to receive a cable so that two cables may be passed through the plug, one through each opening, before a splice is made between the two cables.

11. The system as set forth in claim 1 wherein the sealing liquid is a two-component settable compound, further including a pouch secured to the tube, said pouch containing at least one component of the settable compound, the contents of the pouch being pourable into the tube.

12. A system for sealing a splice between a plurality of electrical cables such as telephone cables, cable television cables, and the like comprising:
   a rigid tube having a generally open end to allow insertion of a splice into the interior of the tube;
   a settable sealing liquid disposed in the tube such that when the splice is inserted in the tube at least a predetermined distance the splice is immersed in the liquid;
   means for holding the splice in place with respect to the tube once the splice is immersed in the sealing liquid, said holding means including a cap for covering the generally open end of the tube, said cap having openings for the cables of the splice to extend therethrough, said cap and said generally open end of the tube having cooperating means thereon to substantially resist removal of the cap, said cap being substantially fixed in position with respect to said tube; and
   movable means disposed generally at the end of the tube opposite the cap for reducing the available interior volume of the tube as said movable means is moved towards the cap to pressurize the interior of the tube.

13. The system as set forth in claim 12 wherein the sealing liquid is a two-component settable compound, the setting being initiated by the mixing of the two components of the compound, further including means secured to the tube for mixing the two components of the compound.

14. A system for sealing a splice between a plurality of electrical cables such as telephone cables, cable television cables, and the like comprising:
   a rigid tube having a generally open end to allow insertion of a splice into the interior of the tube;
   a settable sealing liquid disposed in the tube such that when the splice is inserted in the tube at least a predetermined distance the splice is immersed in the liquid;
   means for holding the splice in place with respect to the tube once the splice is immersed in the sealing liquid;
   the sealing liquid being a two-component settable compound, the setting being initiated by the mixing of the two components of the compound; and
   means secured to the tube for mixing the two components of the compound, said mixing means including a removable plunger disposed at the generally open end of the tube and being adapted for axial movement in the tube.

15. The system as set forth in claim 14 further including a foam plug shaped to fit around the cables above the splice in the tube.

16. The system as set forth in claim 15 further including an open mesh pouch disposed in the tube around the splice.

17. The system as set forth in claim 15 wherein the foam plug includes a pair of permanent openings extending therethrough, each shaped to receive a cable so that two cables may be passed through the plug, one through each opening, before a splice is made between the two cables.

18. The system as set forth in claim 12 wherein the sealing liquid is a two-component settable compound, further including a pouch secured to the tube, said pouch containing at least one component of the settable compound, the contents of the pouch being pourable into the tube.

19. A method of sealing a splice between a plurality of electrical cables such as telephone cables, cable television cables, and the like comprising:
   mixing a two-component settable liquid in a tube to start the setting of the liquid;
   feeding each cable separately through a retaining cap;
   making a splice between the cables; and
   inserting the splice into the mixed settable liquid and securing the retaining cap on the tube to hold the splice in the mixed settable liquid while the liquid sets to form a seal about the splice;
   wherein the mixing step includes reciprocating a plunger axially in the tube.

20. The method as set forth in claim 19 including the further step of removing the plunger from the tube after the mixing step to open one end of the tube, said retaining cap securing step occurring at the open end of the tube once the plunger is removed.

21. The method as set forth in claim 20 including the further step of pressurizing the liquid in the tubes by axially moving a piston disposed in the end of the tube opposite the retaining cap toward the retaining cap to exert pressure on the liquid in the tube.

22. The method as set forth in claim 20 wherein the tube is relatively rigid at the retaining cap end and is relatively flexible at the opposite end, including the further step of pressurizing the liquid by folding up the flexible end of the tube to force sealing liquid from the flexible end of the tube toward the rigid end of the tube.

23. A method of sealing a splice between a plurality of electrical cables such as telephone cables, cable television cables, and the like comprising:
   making a splice between at least a pair of electrical cables;
   reciprocatingly moving a plunger with a mixer head in a rigid tube containing two components of a settable liquid to initiate the setting of the liquid, said plunger being sealingly mounted in a relatively open end of the rigid tube to prevent the settable liquid from escaping from the rigid tube during mixing;
   removing the plunger from the rigid tube to open the relatively open end of the tube; and
   inserting the splice through the relatively open end of the tube and immersing the splice in the mixed settable liquid before the liquid sets, so that the settable liquid as it sets forms a seal about the splice.

24. A system for sealing a splice between the wires of a plurality of electrical cables, such as telephone cables, cable television cables and the like, comprising:
   a tube having a generally open end to allow insertion of a splice into the interior of the tube;
   a sealing material disposed in the tube such that when the splice is inserted in the tube at least a predetermined distance the splice is immersed in the material; and
   means for pressurizing the interior of the tube once the splice is inserted therein to force the sealing material into and around the splice before the liquid sets to form a seal about the splice, said pressurizing means including a piston disposed for axial movement in the tube generally at one end of the tube.

25. The system as set forth in claim 24 wherein said pressurizing means includes a cap for covering the generally open end of the tube, said cap having openings for the cables of the splice to extend therethrough, said cap and said generally open end of the tube having cooperating means thereon to substantially resist removal of the cap as the interior of the tube is pressurized, said cap being substantially fixed in position with respect to said tube.

* * * * *